US012152764B1

(12) United States Patent
Lin et al.

(10) Patent No.: US 12,152,764 B1
(45) Date of Patent: Nov. 26, 2024

(54) LAMP DEVICE AND OPERATING METHOD THEREOF

(71) Applicant: Qisda Corporation, Taoyuan (TW)

(72) Inventors: Li-Chuan Lin, Taoyuan (TW); Yung-Ming Yen, Taoyuan (TW); Min-Han Zhan, Taoyuan (TW)

(73) Assignee: Qisda Corporation, Taoyuan (TW)

(*) Notice: Subject to any disclaimer, the term of this patent is extended or adjusted under 35 U.S.C. 154(b) by 0 days.

(21) Appl. No.: 18/648,606

(22) Filed: Apr. 29, 2024

(30) Foreign Application Priority Data

May 10, 2023 (TW) ................................ 112117315

(51) Int. Cl.

| | |
|---|---|
| ***F21V 21/28*** | (2006.01) |
| ***F21V 21/096*** | (2006.01) |
| ***F21V 21/116*** | (2006.01) |
| ***F21V 21/14*** | (2006.01) |
| ***F21V 21/26*** | (2006.01) |
| ***F21V 33/00*** | (2006.01) |

(52) U.S. Cl.

CPC .......... *F21V 21/28* (2013.01); *F21V 21/0965* (2013.01); *F21V 21/116* (2013.01); *F21V 21/145* (2013.01); *F21V 21/26* (2013.01); *F21V 33/0052* (2013.01)

(58) Field of Classification Search

CPC ...... F21V 21/26; F21V 21/28; F21V 21/0965; F21V 21/116; F21V 21/145; F21V 33/0052

USPC ................................................ 362/253, 285

See application file for complete search history.

(56) References Cited

U.S. PATENT DOCUMENTS

| | | | | |
|---|---|---|---|---|
| 4,432,042 A * | 2/1984 | Zeller | F21V 33/0048 | 362/197 |
| 6,022,119 A * | 2/2000 | Booty, Jr. | F21V 27/00 | 362/450 |
| 6,406,161 B1 * | 6/2002 | Lin | F21V 23/06 | 362/85 |
| 6,419,370 B1 * | 7/2002 | Chen | F21V 21/28 | 362/396 |

(Continued)

FOREIGN PATENT DOCUMENTS

| | | |
|---|---|---|
| CN | 2333125 Y | 8/1999 |
| CN | 103855331 A | 6/2014 |

(Continued)

OTHER PUBLICATIONS

Office action of counterpart application by Taiwan IP Office on Jan. 15, 2024.

*Primary Examiner* — Laura K Tso

(57) ABSTRACT

A lamp device applicable to a display includes a lamp main body, a lamp arm component, a lamp light component and a fixing base. The fixing base is arranged on the back surface of the display, so that the lamp main body can be positioned on the fixing base to be arranged on the back surface. When the lamp arm component is rotated to the first position relative to the lamp main body, the lamp light component has a first height relative to the display, so that a first use state is provided. When the lamp arm component is rotated to the second position relative to the lamp main body, the lamp light component can be detached from the lamp arm component and then reversely installed thereon. The lamp light component has a second height different relative to the display, so that a second use state is provided.

19 Claims, 9 Drawing Sheets

(56) References Cited

U.S. PATENT DOCUMENTS

2008/0137326 A1* 6/2008 Levine ................ F21V 21/0885
362/370

FOREIGN PATENT DOCUMENTS

| | | | |
|---|---|---|---|
| CN | 211979714 | U | 11/2020 |
| CN | 216744232 | U | 6/2022 |
| CN | 219414604 | U | 7/2023 |

* cited by examiner

LAMP DEVICE AND OPERATING METHOD THEREOF

This application claims the benefit of Taiwan application Serial No. 112117315, filed May 10, 2023, the subject matter of which is incorporated herein by reference.

FIELD OF THE INVENTION

The invention relates in general to a lamp device and an operating method thereof, and more particularly to a lamp device applicable to a display and an operating method thereof.

DESCRIPTION OF THE PRIOR ART

Generally speaking, consumers prefer that the lighting height or lighting angle of a lamp device applicable to a display can be adjusted to meet the needs in different scenarios. Currently, an auxiliary lamp applicable to the display can only be used for a fixed region and is inconvenient for consumers to carry with. Therefore, it has become a prominent task for industries to provide an improved lamp carrier and an operating method thereof to meet consumers' needs.

SUMMARY OF THE INVENTION

The present invention provides a lamp device and an operating method thereof capable of providing different lighting heights and convenient portability.

According to a first aspect of the present invention, a lamp device applicable to a display is provided. The lamp device includes a lamp main body, a lamp arm component, a lamp light component and a fixing base. The display has a display surface and a back surface corresponding to the display surface. The lamp arm component is connected between the lamp light component and the lamp main body and is rotatably connected to the lamp main body. The lamp light component is detachably connected to the lamp arm component. The fixing base is arranged on the back surface of the display, so that the lamp main body can be positioned on the fixing base to be arranged on the back surface. When the lamp arm component is rotated to the first position relative to the lamp main body, the lamp light component has a first height relative to the display, so that a first use state is provided. When the lamp arm component is rotated to the second position relative to the lamp main body, the lamp light component is allowed to be detached from the lamp arm component and then reversely installed thereon. The lamp light component has a second height different from the first height relative to the display, so that a second use state is provided.

According to a second aspect of the present invention, an operating method of a lamp device is provided. The operating method includes the following steps. A lamp device is provided, wherein the lamp device includes a lamp main body, a lamp arm component, a lamp light component and a fixing base; the lamp arm component is rotatably connected to the lamp main body and the lamp light component is detachably connected to the lamp arm component. The fixing base is arranged on the back surface of the display. The lamp arm component is rotated to the first position relative to the lamp main body to be arranged on the lamp arm component. The lamp main body is positioned on the fixing base, so that the lamp light component has a first height relative to the display. The lamp arm component is rotated to the second position relative to the lamp main body and is detached from the lamp arm component and then is reversely installed on the lamp arm component. The lamp main body is positioned on the fixing base, so that the lamp light component has a second height different from the first height relative to the display.

According to a third aspect of the present invention, another operating method of a lamp device is provided. The operating method includes the following steps. A lamp device is provided, wherein the lamp device includes a lamp main body, a lamp arm component and a lamp light component; the lamp arm component is rotatably connected to the lamp main body and the lamp light component is detachably connected to the lamp arm component. The lamp arm component is rotated to the first position relative to the lamp main body and the lamp light component is arranged on the lamp arm component, so that the lamp device presents a first use state. The lamp arm component is rotated to the second position relative to the lamp main body and the lamp light component is detached from the lamp arm component and then is reversely installed on the lamp arm component, so that the lamp device presents a second use state. The lamp arm component is rotated to the second position relative to the lamp main body, and the lamp light component is detached from the lamp arm component and then is attracted to the lamp main body, so that the lamp device presents a storage state, wherein the lamp light component and the lamp main body respectively include a magnetic attraction module.

The above and other aspects of the invention will become better understood with regard to the following detailed description of the preferred but non-limiting embodiment(s). The following description is made with reference to the accompanying drawings.

DETAILED DESCRIPTION

Detailed descriptions of each embodiment of the present invention are disclosed below with reference to accompanying drawings. Apart from the said detailed descriptions, any embodiments in which the present invention can be used as well as any substitutions, modifications or equivalent changes of the said embodiments are within the scope of the present invention, and the descriptions and definitions in the claims shall prevail. These drawings are for describing the connection relationship between the elements of the in embodiments, and the dimension scales used in the accompanying drawings are not based on actual proportion of the elements.

Figure 1A:
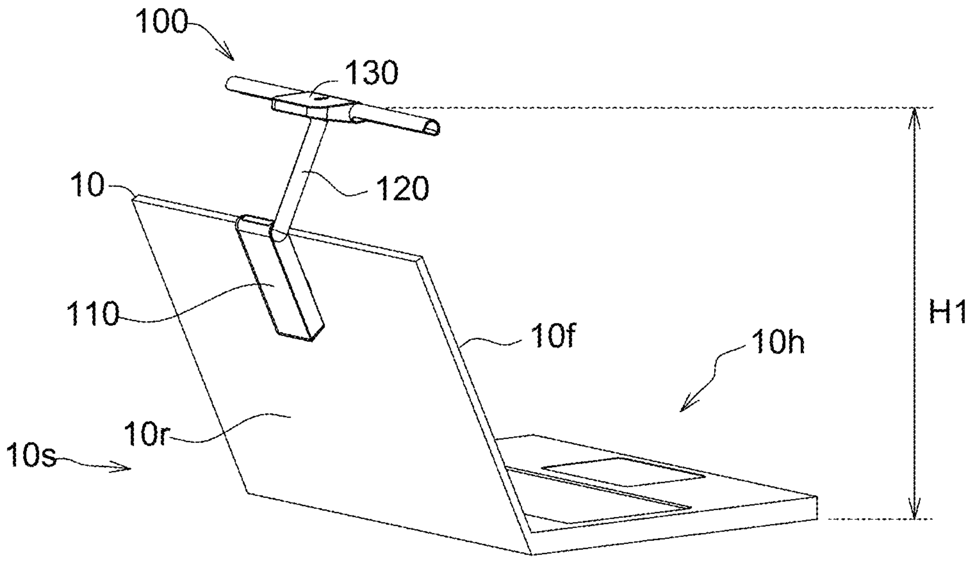
FIGS. 1A and 1B are schematic diagrams of a display of a lamp device in a first use state and a second use state according to the present invention.
Figure 1B:
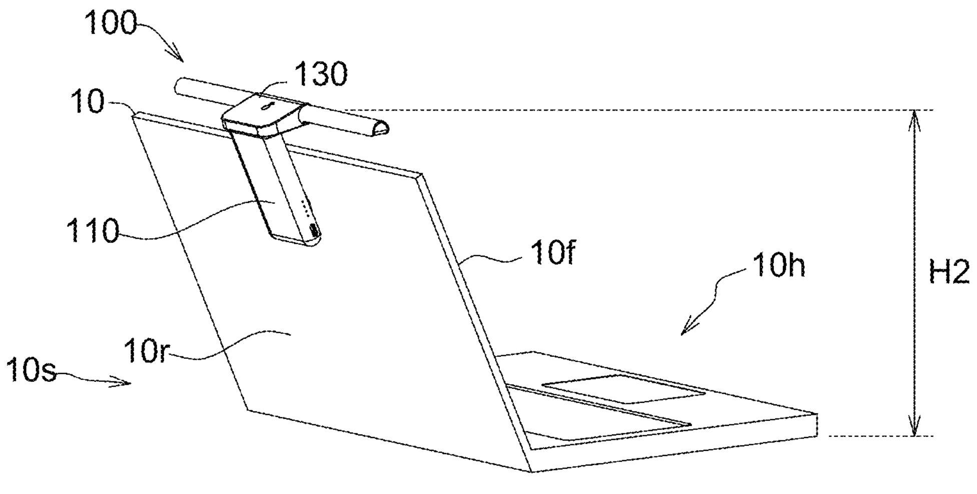
Figure 2:
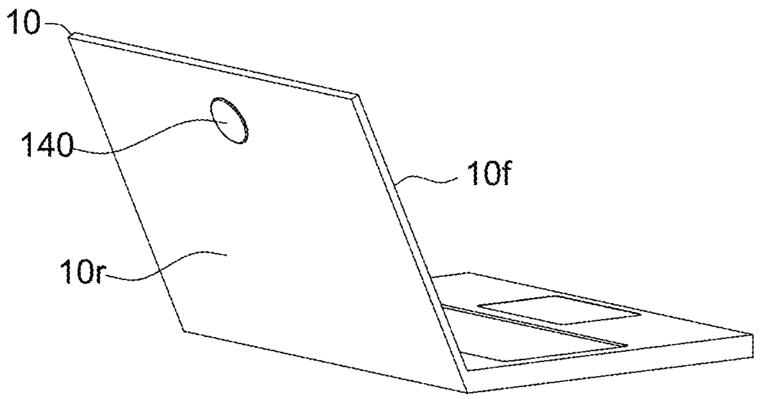
FIG. 2 is a schematic diagram of a fixing base included in a lamp device and arranged on a display according to the present invention.

Refer to FIGS. 1A, 1B and 2. FIGS. 1A and 1B are schematic diagrams of a display 10 of a lamp device 100 in different use states according to the present invention. FIG. 2 is a schematic diagram of a fixing base included in a lamp device 100 and arranged on a display 10 according to the present invention.

The display 10 can be realized by such as the display of a laptop computer. The display 10 has a display surface 10*f* and a back surface 10*r* corresponding to the display surface 10*f*. The lamp device 100 is applicable to the display 10 and arranged on the back surface 10*r* as an auxiliary lighting device of the laptop computer. The lamp device 100 includes a lamp main body 110, a lamp arm component 120, a lamp light component 130 and a fixing base 140. The lamp arm component 120 is rotatably connected to the lamp main body 110. The lamp light component 130 is detachably connected to the lamp arm component 120. The lamp arm component 120 is connected between the lamp light component 130 and the lamp main body 110. As indicated in FIG. 2, the fixing base 140 can be arranged on the back surface 10*r* of the display 10, so that the lamp main body can be positioned on the fixing base 140 to be arranged on the back surface 10*r* as indicated in FIGS. 1A and 1B. Specifically, the fixing base 140 includes an adhesive layer with which the fixing base 140 is attached to the back surface 10*r* of the display 10. Besides, the lamp main body 110 can be positioned on the fixing base 140 by way of magnetic attraction.

When the lamp arm component 120 is rotated to the first position relative to the lamp main body 110, the lamp arm component 120 and the lamp main body 110 are unfolded at an angle as indicated in FIG. 1A. The lamp light component 130 has a first height H1 relative to the display 10, so that the lamp device is provided with a first use state as indicated in FIG. 1A. That is, the lamp light component 130 can provide illumination to the front region 10*h* which the display surface 10*f* faces as indicated in FIG. 1A. The front region 10*h* includes a keyboard or a desktop region in front of the keyboard. When the lamp arm component 120 is rotated to the second position relative to the lamp main body 110, the lamp arm component 120 and the lamp main body 110 are in a collected state as indicated in FIG. 1B. The lamp light component 130 is allowed to be detached from the lamp arm component 120 and then is reversely installed on the lamp arm component 120 in response to the situation where the lamp main body 110 substantially needs to be rotated by 180° to provide the display 10 with an illumination. Meanwhile, the lamp light component 130 has a second height H2 different the first height H1 relative to the display 10, so that the lamp device 100 is provided with a second use state as indicated in FIG. 1B. That is, the lamp light component 130 can provide illumination to the front region 10*h* which the display surface 10*f* faces as indicated in FIG. 1B. The front region 10*h* includes a keyboard or a desktop region in front of the keyboard. In comparison to the lamp light component 130 of FIG. 1A, the lamp light component 130 of FIG. 1B is less flexible in the adjustment of lighting range. In the present embodiment, the first height H1 is greater than the second height H2. That is, the lamp device 100 in the first use state can provide the user with a higher lighting height and can be used in a situation where the desktop region surrounding the keyboard of the laptop computer needs illumination. The lamp device 100 in the second use state can provide the user with a lower lighting height and can be used in a situation where the illumination in the keyboard region of the laptop computer is emphasized.

Figure 1C:
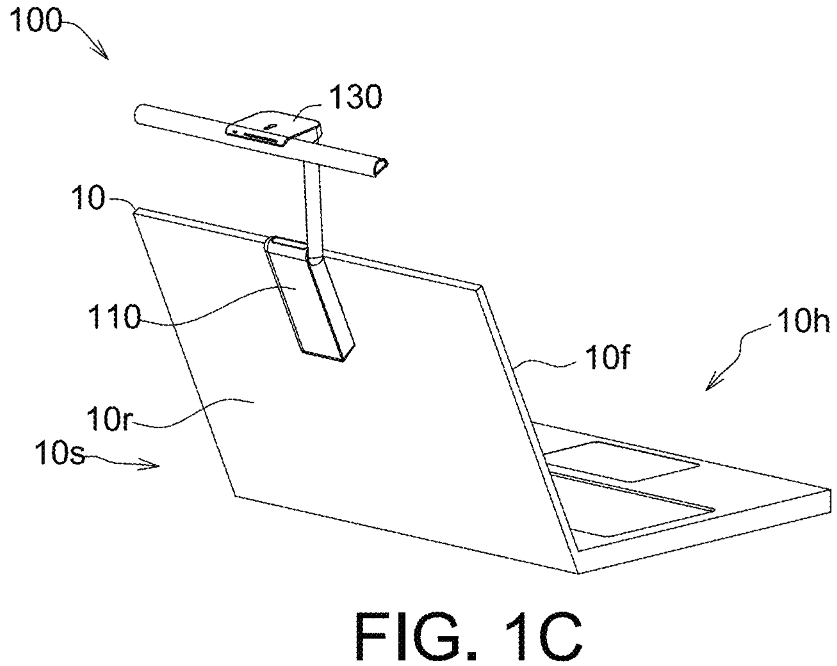
FIGS. 1C and 1D are schematic diagrams of state of a display of a lamp device in a third use state and a fourth use according to the present invention.
Figure 1D:
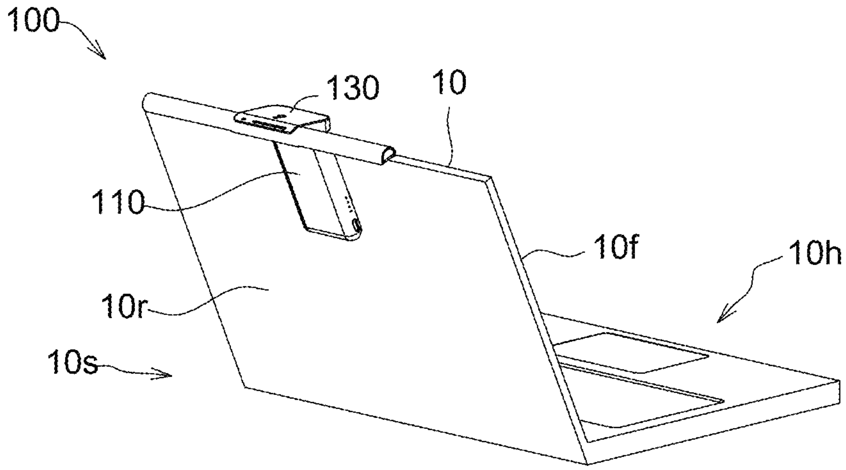

Refer to FIGS. 1C, 1D and 2. FIGS. 1C and 1D are schematic diagrams of a display 10 of a lamp device 100 in another two use states according to the present invention.

When the lamp arm component 120 is rotated to the first position relative to the lamp main body 110, the lamp arm component 120 and the lamp main body 110 form an angle as indicated in FIG. 1C. Meanwhile, the lamp light component 130 is allowed to be detached from the lamp arm component 120 and then is reversely installed on the lamp arm component 120 (inverse to the first use state as indicated in FIG. 1A), and the lamp main body 110 is allowed to be positioned on the fixing base 140, so that the lamp light component 130 can provide illumination to the rear region 10*s* which the back surface 10*r* faces as indicated in FIG. 1C. The rear region 10*s* is basically the desktop or wall behind the display 10. An auxiliary light source of the display 10 can be arranged in the rear region 10*s*. This arrangement corresponds to the third use state of the lamp device 100 as indicated in FIG. 1C. However, when the lamp arm component 120 is rotated to the second position relative to the lamp main body 110, the lamp arm component 120 and the lamp main body 110 are in a collected state as indicated in FIG. 1D. Meanwhile, the lamp light component 130 is allowed to be detached from the lamp arm component 120 and then is reversely installed on the lamp arm component 120 (inverse to the second use state as indicated in FIG. 1B), so that the lamp light component 130 can provide illumination to the rear region 10*s* which the back surface 10*r* faces as indicated in FIG. 1D. This arrangement corresponds to the fourth use state of the lamp device 100 as indicated in FIG. 1D. That is, in the third and the fourth use state, extra illumination can be provided to the rear region 10*s* of the display 10 at different lighting heights. For instance, extra illumination can be provided to reduce the difference of brightness between the area ahead of the display surface 10*f* of the display 10 and the area behind.

Refer to FIGS. 3A, 3B, 3C and 3D. Descriptions of the operating method of the lamp device 100 are disclosed below with these accompanying drawings. According to the operating method of the lamp device according to the present invention, firstly, the lamp device 100 is provided, and the fixing base 140 is arranged on the back surface 10*r* of the display 10 as indicated in FIG. 2.

Figure 3A:
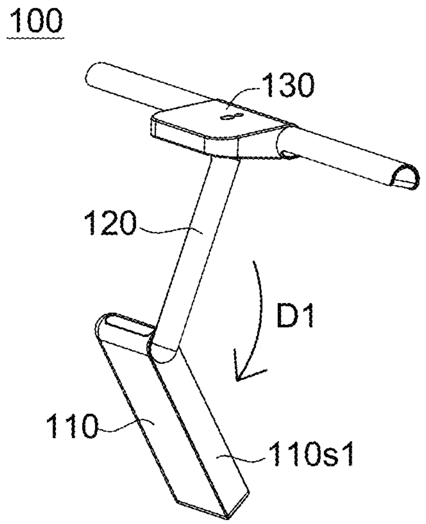
FIGS. 3A, 3B, 3C and 3D are schematic diagrams of a lamp device switching from the first use state according to the present invention.
Figure 3B:
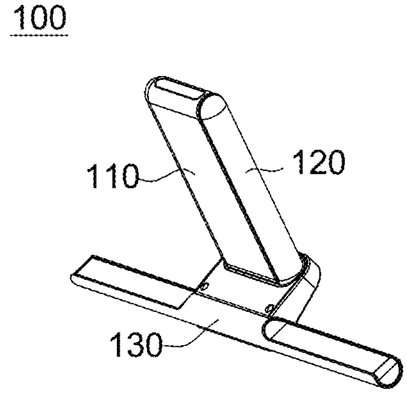
Figure 3C:
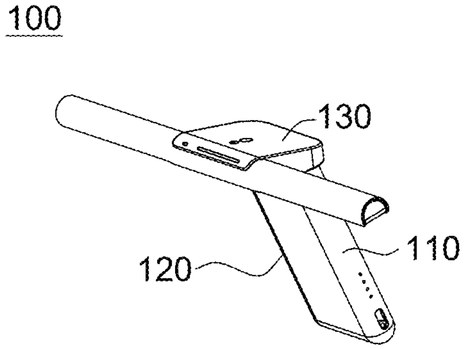
Figure 3D:
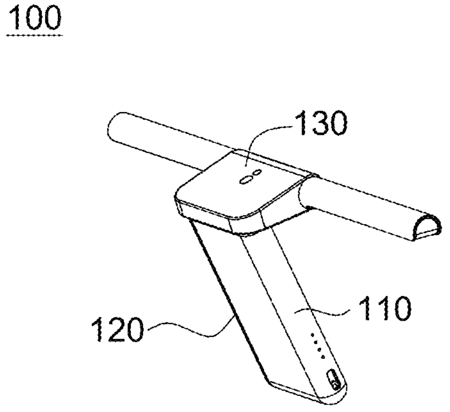
Figure 4:
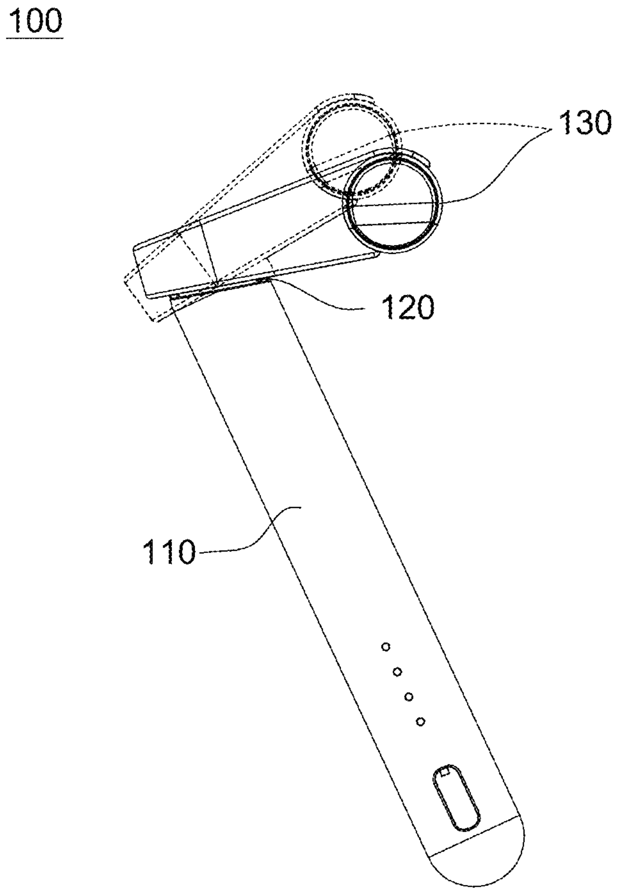
FIG. 4 is a side view of a lamp device in a second use state according to the present invention.

FIGS. 3A, 3B, 3C and 3D are schematic diagrams of a lamp device 100 switching from the first use state to according to the present invention. When the user desires to adjust the lamp device 100 to the first use state as indicated in FIG. 3A, the user can first of all rotate the lamp arm component 120 to the first position relative to the lamp main body 110. At the first position, the lamp arm component 120 and the lamp main body 110 are unfolded to a maximum angle; that is, the pivotal rotation of the lamp arm component 120 relative to the lamp main body 110 is restricted and the user can obtain the knowledge that the lighting height of the lamp arm component 120 has been adjusted to optimum design. Then, the lamp light component 130 is detachably arranged on the lamp arm component 120 to provide illumination to the front region 10*h* which the display surface 10*f* of the display 10 faces. For instance, the lamp light component 130 can be arranged on the lamp arm component 120 by way of magnetic attraction. Then, the lamp main body 110 is positioned on the fixing base 140 as indicated in FIG. 4, so that the lamp light component 130 has a first height H1 relative to the display 10 as indicated in FIGS. 1A and 1*s* able to provide illumination to the front region 10*h* (the keyboard or the desktop close to the user).

When the user desires to adjust the lamp device 100 from the first use state to the second use state, the user can first of all collects the lamp arm component 120 by rotating the lamp arm component 120 to the second position relative to the lamp main body 110 along the direction D1. At the second position, the lamp arm component 120 tightly abuts the first edge 110*s*1 of the lamp main body 110; meanwhile, the state of the lamp device 100 switches from the state as indicated in FIG. 3A to the state as indicated in FIG. 3B. Then, the lamp main body 110 is substantially rotated by 180°, so that the lamp light component 130 is restored to the top of the lamp device 100; meanwhile, the state of the lamp device 100 switches from the state as indicated in FIG. 3B to the state as indicated in FIG. 3C. Since the lamp light component 130 of the lamp device 100 in the state as indicated in FIG. 3C is inverse to the lamp light component 130 of the lamp device 100 in the state as indicated in FIG. 3A, the lamp light component 130 needs to be detached from the lamp arm component 120 and then is reversely installed on the lamp arm component 120; meanwhile, the state of the lamp device 100 switches from the state as indicated in FIG. 3C to the state as indicated in FIG. 3D. Through inverse installation, the lamp light component 130 can provide illumination to the front region 10*h* which the display surface 10*f* faces as indicated in FIG. 1D. Then, the lamp main body 110 is positioned on the fixing base 140 which has been arranged on the display 10, so that the lamp light component 130 has a second height H2 different from the first height H1 relative to the display 10 as indicated in FIG. 1B. Thus, the lamp device 100 switches from the first use state to the second use state. Similarly, when the user desires to adjust the lamp device 100 from the second use state to the first use state, the user only needs to reversely perform the operations of the state to FIG. 3D to the state as indicated in FIG. 3A.

Besides, when the lamp main body 110 of the lamp device 100 in the state as indicated in FIG. 3B is rotated by 180°, the lamp light component 130 is restored to the top of the lamp device 100 and corresponds to the state as indicated in FIG. 3C. Meanwhile, when the lamp device 100 in the state as indicated in FIG. 3C is arranged on the display 10, a fourth use state as indicated in FIG. 1D can be provided.

In an embodiment, after the state as indicated in FIG. 3A is switched to the state as indicated in FIG. 3B, the lamp main body 110 can be arranged on the fixing base 140, the operations of the subsequent state, that is, the second use state, can be performed. That is, when the lamp device 100 switches between the first use state and the second use state, the lamp main body 110 is rotated by 180° relative to the fixing base 140.

Figure 3E:
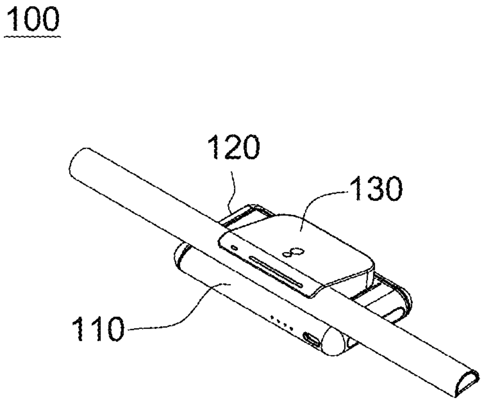
FIG. 3E is a schematic diagram of a lamp device in a storage state according to the present invention.

Referring to FIG. 3E, a schematic diagram of a lamp device 100 in a storage state according to the present invention is shown. The steps of another operating method of a lamp device according to the present invention are as follows. First, a lamp device 100 is provided. As disclosed above, the lamp arm component is rotated to the first position relative to the lamp main body 110 and the lamp light component 130 is detachably arranged on the lamp arm component 120, so that the lamp device presents a first use state as indicated in FIG. 3A. As disclosed above, the lamp arm component 120 is rotated to the second position relative to the lamp main body 110, and the lamp light component 130 is detached from the lamp arm component 120 and then is reversely installed on the lamp arm component 120, so that the lamp device 100 presents a second use state as indicated in FIG. 3D. When the user desires to collect the lamp device 100 so that it can be conveniently carried, the lamp arm component 120 can be rotated relative to the lamp main body 110 or maintain at the second position, and the lamp light component 130 is detached from the lamp arm component 120 and then is attracted to the lamp main body 110, so that the lamp device 100 presents a storage state as indicated in FIG. 3E and can be conveniently carried.

Refer to FIG. 4 to FIG. 7. Detailed descriptions of the arrangements and functions of the lamp device 100 are disclosed below with these accompanying drawings. FIG. 4 is a side view of a lamp device 100 in a second use state according to the present invention. The lamp light component 130 can be pivotally connected to the lamp arm component 120 to swing relative to the lamp main body 110 and provide different lighting angles at which different lighting needs can be met.

Figure 5:
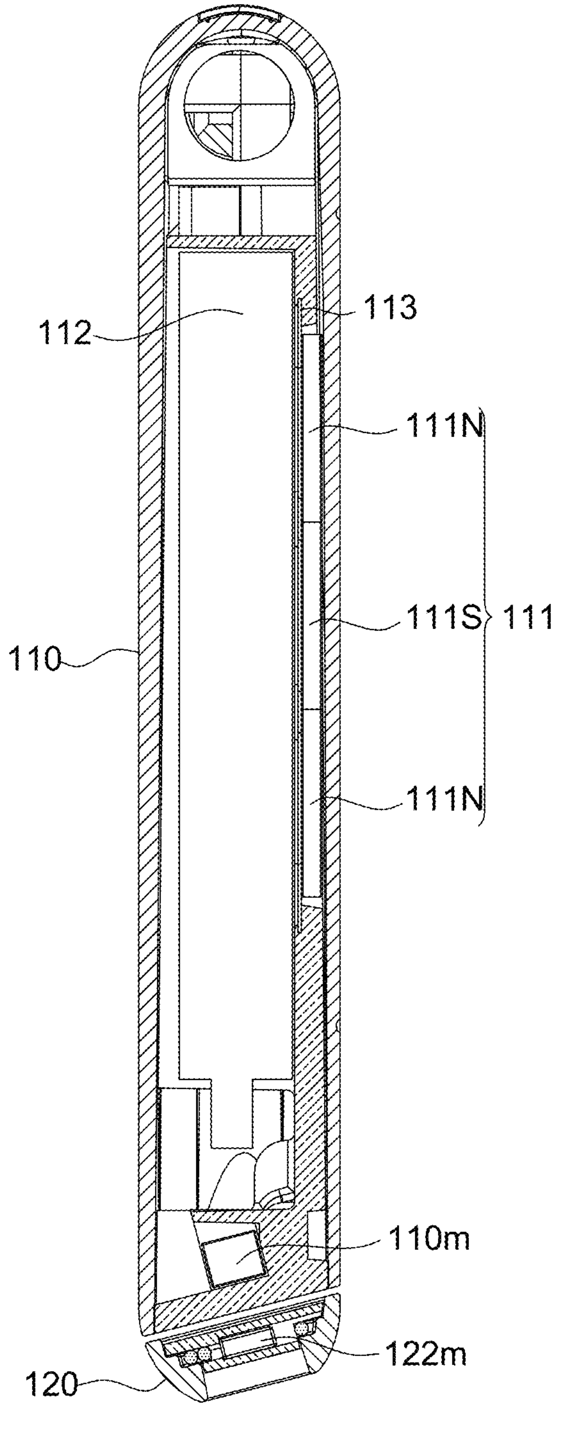
FIG. 5 is a perspective side view of a lamp main body and a lamp arm component included in a lamp device according to the present invention.

FIG. 5 is a perspective side view of a lamp main body 110 and a lamp arm component 120 included in a lamp device 100 according to the present invention. The lamp main body 110 includes a magnetic attraction module 111, a battery module 112 and a supporting member 113. The magnetic attraction module 111 has one or more than one N-polarity magnetic attraction unit 111N and one or more than one S-polarity magnetic attraction unit 111S. The supporting member 113 can be realized by a plate piece made of iron. The magnetic attraction module 111 and the battery module 112 are fixed on two opposite sides of the supporting member 113. The supporting member 113 can provide the battery module 112 with a stable fixing surface whose structural hardness avoids the battery module being damaged when the lamp device 100 is hit or squeezed.

Figure 6:
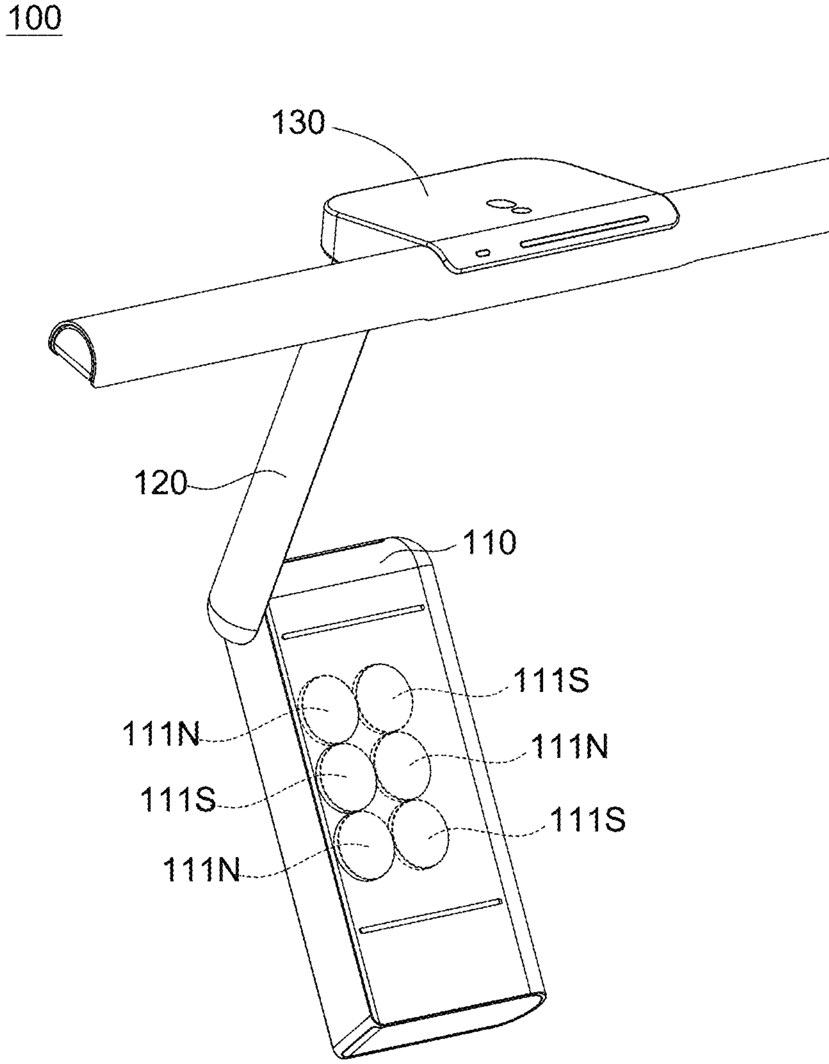
FIG. 6 is a partial perspective view of a lamp device in a first use state according to the present invention.

FIG. 6 is a partial perspective view of a lamp device 100 in a first use state according to the present invention. The fixing base 140 (illustrated in FIG. 2) has magnetism, and the lamp main body 110 can be attracted to the fixing base 140 through the magnetic attraction module 111. In the present embodiment, the magnetic attraction module 111 includes 6 magnetic attraction units composed of 3 N-polarity magnetic attraction units 111N and 3 S-polarity magnetic attraction units 111S. The N-polarity magnetic attraction units 111N and the S-polarity magnetic attraction units 111S are staggered with each other to increase magnetic attraction. In response to the storage state of the lamp device 100 (illustrated in FIG. 3E), the lamp light component 130 also includes a magnetic attraction module (not illustrated), so that the magnetic attraction module 111 can attract the lamp light component 130 and present a storage state.

Figure 7:
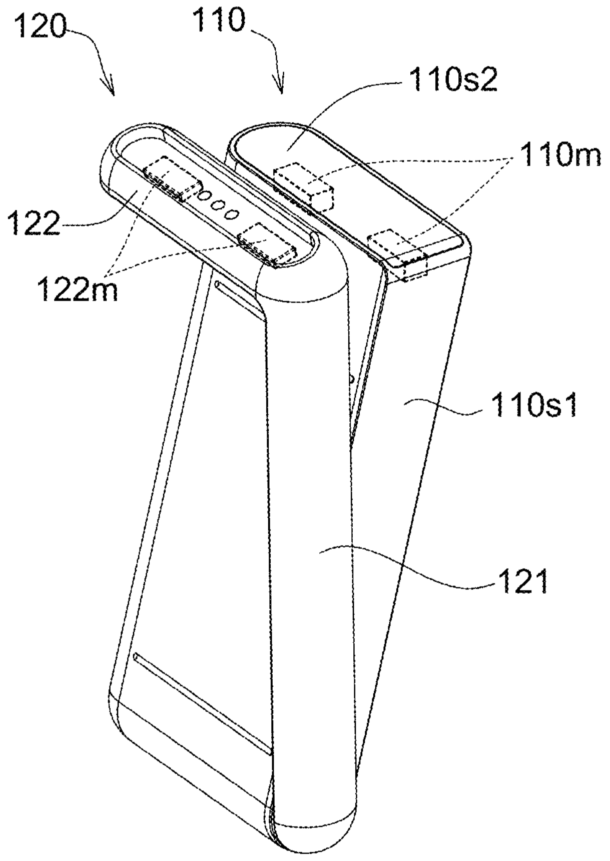
FIG. 7 is a partial perspective view of a lamp main body and a lamp arm component included in a lamp device according to the present invention.

FIG. 7 is a partial perspective view of a lamp main body 110 and a lamp arm component 120 included in a lamp device 100 according to the present invention. The lamp arm component 120 includes a first light arm 121 and a second light arm 122 connected to the first light arm 121. In the present embodiment, the first light arm 121 and the second light arm 122 substantially form an angle of 90° even when the lamp arm component 120 is an L-shaped structure. The first light arm 121 can be pivotally connected to the lamp main body 110 to be arranged on the first edge 110*s*1 of the lamp main body 110. In the present embodiment, the lamp light component 130 is detachably connected to the second light arm 122, which includes a magnetic attraction module 122*m*, so that the magnetic attraction module of the lamp light component 130 can attract the second light arm 122.

When the lamp device 100 is in the second use state, the third use state or the storage state, that is, when the lamp arm component 120 is rotated to the second position relative to the lamp main body 110, the first light arm 121 tightly abuts the first edge 110*s*1 and the second light arm 122 tightly abuts the second edge 110*s*2 of the lamp main body 110 adjacent to the first edge 110*s*1. Moreover, when the lamp device 100 is in the second use state, the third use state or the storage state, that is, when the lamp arm component 120 is rotated to the second position relative to the lamp main body 110, the magnetic attraction module 122*m* of the second light arm 122 can attract the magnetic attraction module 110*m* of the lamp main body 110, so that the lamp arm component 120 and the lamp main body 110 are mutually positioned by way of magnetic attraction.

To summarize, the lamp device and the operating method thereof of the present invention can be switched between different use states to meet the user's different needs in lighting height; furthermore, the lamp light component can be detachably attracted to the lamp main body to enter a storage state to meet the user's needs of portability.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A lamp device applicable to a display, wherein the display has a display surface and a back surface corresponding to the display surface, and the lamp device comprises:
- a lamp main body;
- a lamp arm component rotatably connected to the lamp main body;
- a lamp light component detachably connected to the lamp arm component, wherein the lamp arm component is connected between the lamp light component and the lamp main body; and
- a fixing base arranged on the back surface, so that the lamp main body can be positioned on the fixing base to be arranged on the back surface;
- wherein, when the lamp arm component is rotated to a first position relative to the lamp main body, the lamp light component has a first height relative to the display, so that a first use state of the lamp device is provided; when the lamp arm component is rotated to a second position relative to the lamp main body, the lamp light component is allowed to be detached from the lamp arm component and then is reversely installed on the lamp arm component; the lamp light component has a second height different from the first height relative to the display, so that a second use state of the lamp device is provided.

2. The lamp device according to claim 1, wherein when the lamp device switches between the first use state and the second use state, the lamp main body substantially rotates by 180° relative to the fixing base.

3. The lamp device according to claim 1, wherein the lamp main body comprises a magnetic attraction module, the fixing base has magnetism, and the lamp main body is attracted to the fixing base through the magnetic attraction module.

4. The lamp device according to claim 3, wherein the lamp main body comprises a battery module and a supporting member; the magnetic attraction module and the battery module are fixed on two opposite sides of the supporting member.

5. The lamp device according to claim 1, wherein the lamp arm component comprises a first light arm and a second light arm connected to the first light arm; the first light arm can be pivotally connected to the lamp main body to be arranged on a first edge of the lamp main body; the lamp light component is detachably connected to the second light arm.

6. The lamp device according to claim 5, wherein when the lamp device is in the second use state, the first light arm tightly abuts the first edge, the second light arm tightly abuts a second edge of the lamp main body, and the second edge is adjacent to the first edge.

7. The lamp device according to claim 5, wherein the first light arm and the second light arm substantially form an angle of 90°.

8. The lamp device according to claim 5, wherein the second light arm and the lamp light component respectively comprise a magnetic attraction module, so that the lamp light component can attract the second light arm.

9. The lamp device according to claim 5, wherein the second light arm and the lamp main body respectively comprise a magnetic attraction module; when the lamp device is in the second use state, the second light arm is attracted to the lamp main body.

10. The lamp device according to claim 1, wherein the lamp light component can be pivotally connected to the lamp arm component.

11. An operating method of a lamp device, comprising:
- providing a lamp device, wherein the lamp device comprises a lamp main body, a lamp arm component, a lamp light component and a fixing base; the lamp arm component is rotatably connected to the lamp main body; the lamp light component is detachably connected to the lamp arm component;
- arranging the fixing base on a back surface of a display;
- rotating the lamp arm component to a first position relative to the lamp main body and arranging the lamp light component on the lamp arm component;
- positioning the lamp main body on the fixing base, so that the lamp light component has a first height relative to the display;
- rotating the lamp arm component to a second position relative to the lamp main body and detaching the lamp light component from the lamp arm component then reversely installing the lamp light component on the lamp arm component; and
- positioning the lamp main body on the fixing base, so that the lamp light component has a second height different from the first height relative to the display.

12. The operating method of the lamp device according to claim 11, wherein the step of positioning the lamp main body on the fixing base, so that the surface of the lamp light component has a second height different the first height relative to the keyboard of the display comprises:
- substantially rotating the lamp main body by 180° relative to the fixing base.

13. The operating method of the lamp device according to claim 11, wherein the lamp main body is positioned on the fixing base by way of magnetic attraction.

14. The operating method of the lamp device according to claim 11, wherein when the lamp arm component is rotated to the second position relative to the lamp main body, a first light arm of the lamp arm component tightly abuts a first edge of the lamp main body, and a second light arm of the lamp main body tightly abuts a second edge of the lamp main body; the first light arm and the second light arm are interconnected and the second edge is adjacent to the first edge.

15. The operating method of the lamp device according to claim 11, wherein the lamp light component is arranged on the lamp arm component by way of magnetic attraction.

16. The operating method of the lamp device according to claim 11, wherein when the lamp arm component is rotated to the second position relative to the lamp main body, the lamp arm component is attracted to the lamp main body.

17. The operating method of the lamp device according to claim 11, further comprising:

rotating the lamp arm component to the first position relative to the lamp main body and detaching the lamp light component from the lamp arm component then reversely installing the lamp light component on the lamp arm component; and positioning the lamp main body on the fixing base.

18. An operating method of a lamp device, comprising:

providing a lamp device, wherein the lamp device comprises a lamp main body, a lamp arm component and a lamp light component; the lamp arm component is rotatably connected to the lamp main body, and the lamp light component is detachably connected to the lamp arm component;

rotating the lamp arm component to a first position relative to the lamp main body and arranging the lamp light component on the lamp arm component, so that the lamp device presents a first use state;

rotating the lamp arm component to a second position relative to the lamp main body and detaching the lamp light component from the lamp arm component then reversely installing the lamp light component on the lamp arm component, so that the lamp device presents a second use state; and rotating the lamp arm component to the second position relative to the lamp main body and detaching the lamp light component from the lamp arm component then enabling the lamp light component to be attracted to the lamp main body, so that the lamp device presents a storage state, wherein the lamp light component and the lamp main body respectively comprise a magnetic attraction module.

19. The operating method of the lamp device according to claim 18, wherein the magnetic attraction module of the lamp main body has at least one N-polarity magnetic attraction unit and at least one S-polarity magnetic attraction unit; the N-polarity magnetic attraction unit and the S-polarity magnetic attraction unit are staggered with each other.

* * * * *